(12) United States Patent
Mongeau (10) Patent No.: US 11,006,169 B2
(45) Date of Patent: *May 11, 2021

(54) MASTER COMPUTING DEVICE AND METHOD FOR SYNCHRONIZING DISPLAY OF A DIGITAL CONTENT

(71) Applicant: Broadsign Serv, Inc., St. Louis, MO (US)

(72) Inventor: Bryan Mongeau, Beaconsfield (CA)

(73) Assignee: Broadsign Serv, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,992

(22) Filed: Feb. 18, 2020

(65) Prior Publication Data

US 2020/0186865 A1 Jun. 11, 2020

Related U.S. Application Data

(63) Continuation of application No. 16/214,498, filed on Dec. 10, 2018, now Pat. No. 10,609,441.

(51) Int. Cl.
*H04N 21/43* (2011.01)
*H04N 21/81* (2011.01)
*H04N 21/242* (2011.01)
*G06F 3/14* (2006.01)

(52) U.S. Cl.
CPC ....... *H04N 21/4307* (2013.01); *G06F 3/1454* (2013.01); *H04N 21/242* (2013.01); *H04N 21/812* (2013.01)

(58) Field of Classification Search
CPC .................................................. H04N 21/4302
See application file for complete search history.

(56) References Cited

U.S. PATENT DOCUMENTS

| 4,780,883 | A | 10/1988 | O'Connor et al. | |
|---|---|---|---|---|
| 10,609,432 | B1 * | 3/2020 | Mongeau | G06Q 30/0241 |
| 10,609,441 | B1 * | 3/2020 | Mongeau | H04N 21/242 |
| 2008/0177822 | A1 * | 7/2008 | Yoneda | H04N 21/64322 709/202 |
| 2010/0103781 | A1 * | 4/2010 | Rai | G06F 1/12 368/55 |
| 2014/0340330 | A1 | 11/2014 | Trachtenberg et al. | |

(Continued)

*Primary Examiner* — Paulos M Natnael
(74) *Attorney, Agent, or Firm* — Breiner & Breiner, L.L.C.

(57) ABSTRACT

Master computing device and method for synchronizing display of a digital content (for example a digital signage content) on the master computing device and on one or more slave computing device. The master device transmits a synchronization request, comprising a digital content identifier for identifying the digital content, to the slave device (s). The master device determines a number of negative responses received from the slave device(s) in response to the synchronization request. Each negative response is indicative of one among the slave device(s) not being capable of displaying the digital content. The master device transmits a new synchronization request to the slave computing device(s) if the number of received negative responses reaches a threshold. The master computing device transmits a display command to the slave device(s) for displaying the digital content on their respective display(s) if the number of received negative responses does not reach the threshold.

27 Claims, 6 Drawing Sheets

(56) References Cited

U.S. PATENT DOCUMENTS

| | | | |
|---|---|---|---|
| 2015/0142883 A1* | 5/2015 | Ohbi | H04L 67/42 |
| | | | 709/203 |
| 2015/0304526 A1 | 10/2015 | Maurice et al. | |
| 2016/0066000 A1* | 3/2016 | Cunningham | H04N 21/44004 |
| | | | 725/116 |
| 2016/0217604 A1 | 7/2016 | De Roos et al. | |
| 2016/0302166 A1 | 10/2016 | Dang et al. | |
| 2017/0055020 A1 | 2/2017 | Shaw et al. | |
| 2017/0244993 A1 | 8/2017 | Rothschild | |
| 2017/0308922 A1 | 10/2017 | Mongeau | |
| 2018/0109826 A1 | 4/2018 | McCoy et al. | |
| 2019/0174172 A1 | 6/2019 | Eubanks | |
| 2020/0184513 A1* | 6/2020 | Gentile | H04N 21/44204 |

* cited by examiner

MASTER COMPUTING DEVICE AND METHOD FOR SYNCHRONIZING DISPLAY OF A DIGITAL CONTENT

RELATED APPLICATION

This application claims benefit of U.S. Ser. No. 16/214,498, filed Dec. 10, 2018, entitled "Master Computing Device And Method For Synchronizing Display Of Digital Content", which is incorporated herein by reference in its entirety.

TECHNICAL FIELD

The present disclosure relates to the field of digital signage. More specifically, the present disclosure presents a master computing device and a method for synchronizing display of a digital content on the master computing device and on one or more slave computing device.

BACKGROUND

Signage refers to graphic designs, such as symbols, emblems, words, etc. In advertising, signage refers to the design or use of signs and symbols to communicate a message to a specific group, usually for the purpose of marketing. Digital signage is a sub segment of signage and comprises the use of digital signage display units also referred to as digital signage players. Digital signage players include liquid-crystal displays (LCDs), light-emitting diode (LED) displays, projector screens, etc. A digital signage player displays a succession of digital signage contents, such as still images, videos, etc. Digital signage is a field in great expansion especially for advertising in a public venue (e.g. an airport, a shopping mall, etc.), because of the potential to advertise dynamically, such as is done with an advertising video.

In certain circumstances, it is necessary to have the same digital signage content displayed by a plurality of digital signage players in a synchronous manner. For example, in a waiting hall of an airport, all the digital signage players present in the hall display the same advertising campaign at the same time. Furthermore, by contract with the owner of the advertising campaign, the owner of the digital signage infrastructure has the obligation to have the advertising campaign displayed on all of the digital signage players present in the hall and at the same time. It is not acceptable by the terms of the contract that a single digital signage player fails to display the advertising campaign.

In this context, is it not sufficient to a have a digital signage server send a command to all the digital signage players present in the hall for requesting the display of the advertising campaign simultaneously at a given instant. If any one of the digital signage players is not capable of displaying the advertising campaign at the given instant, the terms of the contract with the owner of the advertising campaign are broken. A more sophisticated procedure is necessary for performing the synchronized display of the advertising campaign on all the digital signage players. The procedure needs to provide the capability to address the situation where operating conditions of one of the players do not allow instant display of the advertising campaign.

Furthermore, in some cases, a decentralized digital signage architecture is preferable to a more centralized architecture relying on a digital signage server. In such a decentralized architecture, one of the players acts as a master player and the other players act as slave players. In such a decentralized architecture, the master player assumes the role of a digital signage server and is in charge of controlling the display of digital signage content by the master player itself and by the slave players under its control.

Therefore, there is a need for a master digital signage player and a method for synchronizing display of a digital signage content on the master digital signage player and on one or more slave digital signage player.

SUMMARY

According to a first aspect, the present disclosure relates to a method for synchronizing display of a digital content on a master computing device and on one or more slave computing device. The method comprises determining, by a processing unit of the master computing device, that the digital content shall be displayed synchronously on a display of the master computing device and on a display of the one or more slave computing device. The method comprises transmitting, by the processing unit of the master computing device, a synchronization request to the one or more slave computing device. The synchronization request comprises a digital content identifier for identifying the digital content. The method comprises determining, by the processing unit of the master computing device, a number of negative responses received from the one or more slave computing device in response to the synchronization request. Each negative response is indicative of one among the one or more slave computing device not being capable of displaying the digital content. The method comprises transmitting, by the processing unit of the master computing device, a new synchronization request to the one or more slave computing device if the number of received negative responses reaches a threshold. The new synchronization request comprises the digital content identifier.

According to a second aspect, the present disclosure relates to a non-transitory computer program product comprising instructions executable by a processing unit of a master computing device. The execution of the instructions by the processing unit of the master computing device provides for synchronizing display of a digital content on the master computing device and on one or more slave computing device, by implementing the aforementioned method.

According to a third aspect, the present disclosure relates to a master computing device for synchronizing display of a digital content on the master computing device and on one or more slave computing device. The master computing device comprises a communication interface for exchanging data with the one or more slave computing device, a display and a processing unit. The processing unit determines that the digital content shall be displayed synchronously on the display of the master computing device and on a display of the one or more slave computing device. The processing unit transmits a synchronization request to the one or more slave computing device via the communication interface. The synchronization request comprises a digital content identifier for identifying the digital content. The processing unit determines a number of negative responses received from the one or more slave computing device in response to the synchronization request via the communication interface. Each negative response is indicative of one among the one or more slave computing device not being capable of displaying the digital content. The processing unit transmits a new synchronization request to the one or more slave computing device (via the communication interface) if the number of received negative responses reaches a threshold. The new synchronization request comprises the digital content identifier.

In a particular aspect, the master computing device is a master digital signage player, the one or more slave computing device is a slave digital signage player, and the digital content is a digital signage content.

In another particular aspect, the processing unit of the master computing device transmits a display command to the one or more slave computing device (for displaying the digital content on the display of the one or more slave computing device) if the number of received negative responses does not reach the threshold.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the synchronization of the display of a digital signage content on a synchronized group of digital signage players. The synchronized group comprises a master digital signage player and one or more slave digital signage player. The master digital signage player is in charge of initiating and controlling the synchronization process.

Figure 1:
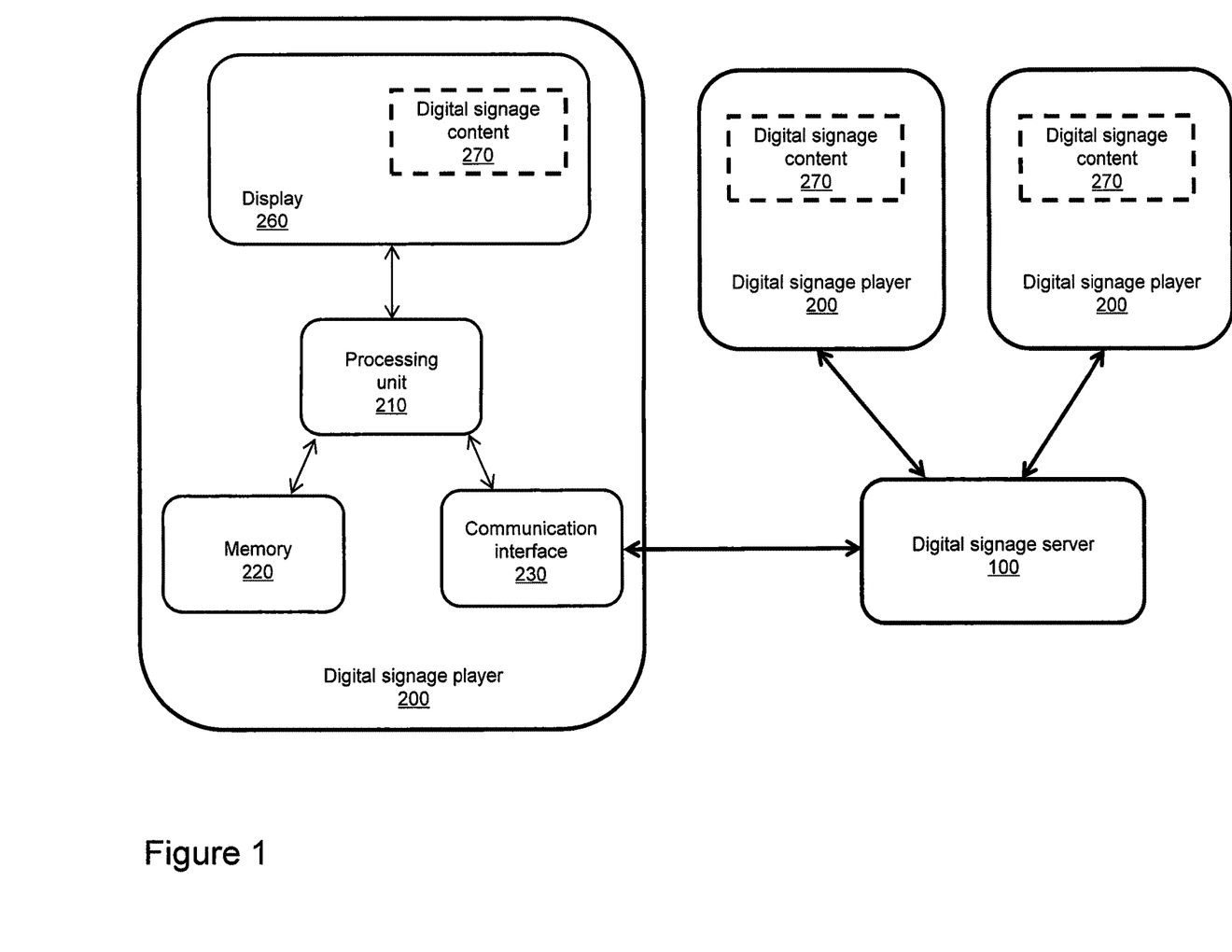
FIG. 1 represents a plurality of digital signage players under the control of a digital signage server.

Referring now to FIG. 1, a digital signage server 100 and a plurality of digital signage players 200 are represented.

In a traditional digital signage infrastructure, the digital signage server 100 controls the digital signage content 270 displayed on the plurality of digital signage players 200. More specifically, the digital signage server 100 determines which digital signage content 270 is displayed on each digital signage player 200, when a digital signage content 270 shall be displayed, how often a digital signage content 270 shall be repeated, at which position of a screen a digital signage content 270 shall be displayed, etc. For this purpose, the digital signage server 100 generates a signage loop to rotate digital signage contents 270 on each digital signage player 200. Each digital signage player 200 receives from the digital signage server 100 its own signage loop, and the digital signage contents 270 referred to in the signage loop. The digital signage player 200 then displays the retrieved digital signage contents 270 in accordance with the signage loop.

The digital signage player 200 is a computing device comprising the following components, illustrated in FIG. 1.

The digital signage player 200 comprises a processing unit 210. The processing unit 210 comprises one or more processors (not represented in FIG. 1) capable of executing instructions of computer program(s) for performing the functionalities of the digital signage player 200 (receiving data, processing the received data, generating data, transmitting the generated data, displaying data on a display 260, etc.). Each processor may further have one or several cores.

The digital signage player 200 comprises memory 220. The memory 220 stores instructions of the computer program(s) executed by the processing unit 210, data generated by the execution of the computer program(s), data received from a communication interface 230, etc. Only a single memory 220 is represented in FIG. 1, but the digital signage player 200 may comprise several types of memories, including volatile memory (such as a volatile Random Access Memory (RAM), etc.) and non-volatile memory (such as a hard drive, electrically-erasable programmable read-only memory (EEPROM), etc.).

Figure 2:
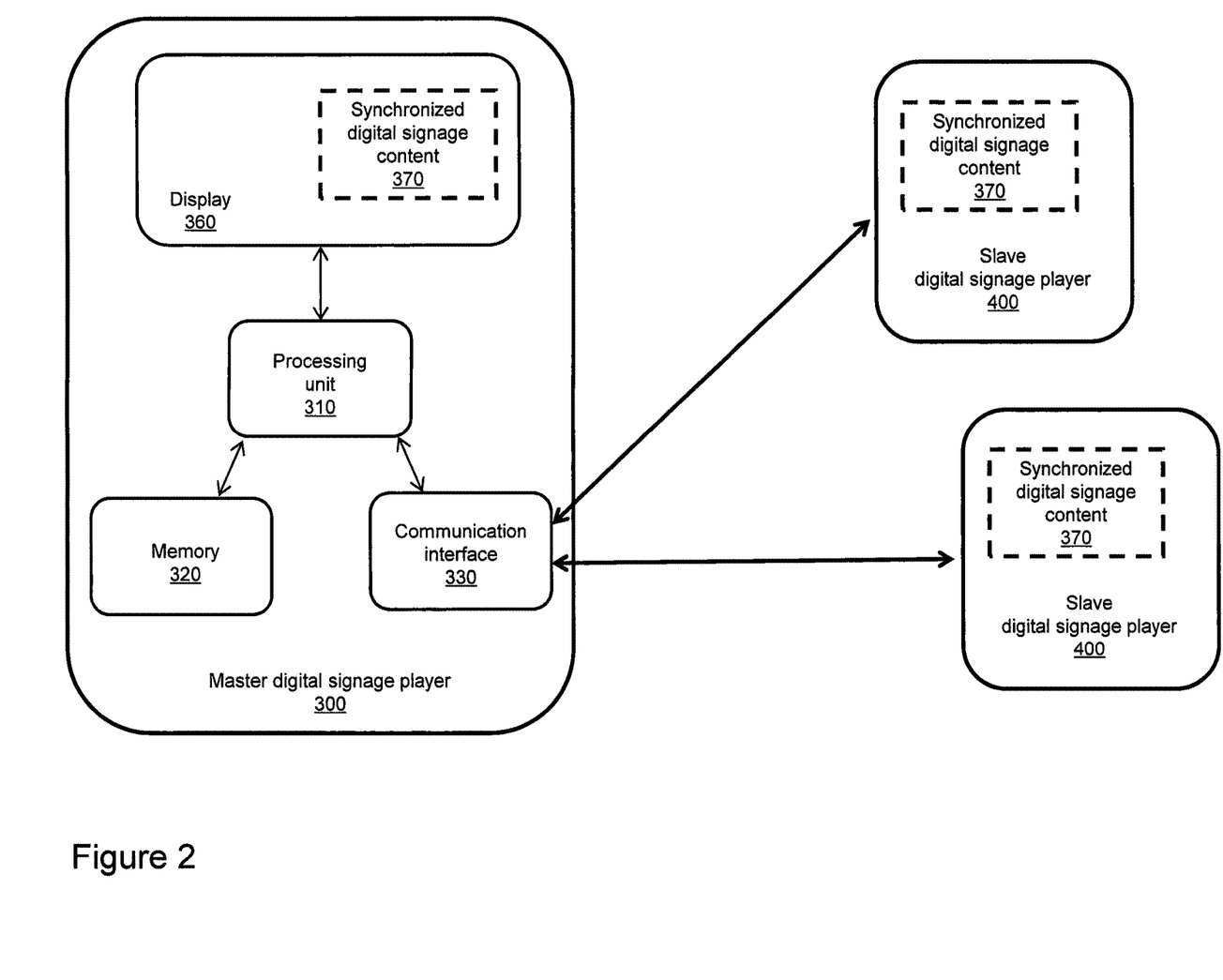
FIG. 2 represents the plurality of digital signage players of FIG. 1 comprising a master player and one or more slave player.

The digital signage player 200 comprises the communication interface 230. The communication interface 230 allows the digital signage player 200 to exchange data with the digital signage server 100, and with other computing devices such as neighbor digital signage players 200 (as illustrated in FIG. 2). For simplification purposes, we refer to a single communication interface 230 capable of supporting one or more of the following communication technologies: fixed broadband, Ethernet, cellular, Wi-Fi, mesh, Bluetooth, etc. For example, the digital signage player 200 communicates with the digital signage server 100 via a cellular network or a fixed broadband network, and communicates with neighbor digital signage players 200 (as illustrated in FIG. 2) via a Wi-Fi network. In this case, the communication interface 230 comprises a cellular communication functionality and a Wi-Fi communication functionality. The communication interface 230 usually comprises a combination of hardware and software executed by the hardware, for implementing the communication functionalities of the communication interface 230.

The digital signage player 200 comprises a display 260. A single display 260 is represented in FIG. 1. However, the digital signage player 200 may comprise several displays 260. Digital signage content is displayed on the one or more display 260. The display 260 consists of, without limitations, a liquid-crystal display (LCD), a light-emitting diode (LED) display, an organic light-emitting diode (OLED) display, a projector screen, a combination thereof, etc. The display 260 may have a large screen, to be visible by a large crowd. The digital signage player 200 is usually located in a public venue (e.g. an airport, a shopping mall, etc.), so that a large number of persons located close to the digital signage player 200 can see a content 270 displayed on its display(s) 260.

The digital signage player 200 may include additional optional components (not represented in FIG. 1), such as a user interface, one or more sensor (e.g. a camera), etc.

The digital signage server 100 is also a computing device comprising the following components: a processing unit, memory, a communication interface, an optional display, an optional user interface, etc. The components of the digital signage server 100 are not represented in FIG. 1 for simplification purposes.

Referring now to FIG. 2, a master digital signage player 300 and a plurality of slave digital signage players 400 are represented. For simplification purposes, the digital signage players will be referred to as players in the rest of the description.

The master player 300 and the slave players 400 correspond to the players 200 represented in FIG. 1. The master player 300 and the slave players 400 are members of a synchronized group of players. The synchronized group comprises one master player and at least one slave player. The synchronized group may include any number of slave players. One player of the synchronized group is selected for being the master player, and the rest of the players of the synchronized group become the slave players.

Within a given geographical area (e.g. an airport, a shopping mall, one or more streets, etc.) where a plurality of players are located, one or more synchronized group of players may be set up. The players of a synchronized group have characteristics in common. Based on these characteristics, the same digital signage content is displayed synchronously on the displays of the players of the synchronized group. For instance, FIG. 2 illustrates the synchronous display of the same digital signage content 370 on the display 360 of the master player 300 and on the displays (not represented in FIG. 2 for simplification purposes) of the slave players 400.

The synchronized display of the same digital signage content is controlled by the master player 300 of a synchronized group, instead of being controlled by the digital signage server 100 represented in FIG. 1. The players of a synchronized group operate all the time under the control of their master player 300. Alternatively, the players of a synchronized group operate only at given moments of time under the control of their master player 300. The rest of the time, the players of a synchronized group operate under the control of the digital signage server 100 represented in FIG. 1. The players of a synchronized group may also operate simultaneously under the control of their master player 300 for synchronized digital signage content and under the control of the digital signage server 100 represented in FIG. 1 for unsynchronized digital signage content. However, in an alternative implementation, the master may be a server such as the digital signage server 100, while the slaves remain the slave players 400.

Although a single synchronized digital signage content 370 is represented in FIG. 2, several independent digital signage contents may be displayed at the same time in a synchronized manner by the master player 300 and the slave players 400.

In order to perform a synchronized display of the digital signage content 370 by the master player 300 and the one or more slave player 400, the digital signage content 370 must be available to the master player 300 and to the one or more slaver players 400. For instance, the digital signage content 370 is downloaded from a central repository and stored at the master player 300 and at the one or more slaver player 400. The digital signage content 370 is downloaded and cached locally rather than being streamed from the central repository to avoid communication problems which may occur between the central repository and some of the players, preventing real time streaming of the digital signage content 370.

In addition to having the digital signage content 370 stored on the players 300 and 400 before displaying it, the players 300 and 400 need to be in operating conditions allowing display of the digital signage content 370 on their respective displays. For example, if one of the players is out of order, the display of the digital signage content 370 cannot be performed. An exhaustive list of all the conditions under which the display of the digital signage content 370 cannot be performed is out of the scope of the present disclosure.

Figure 3:
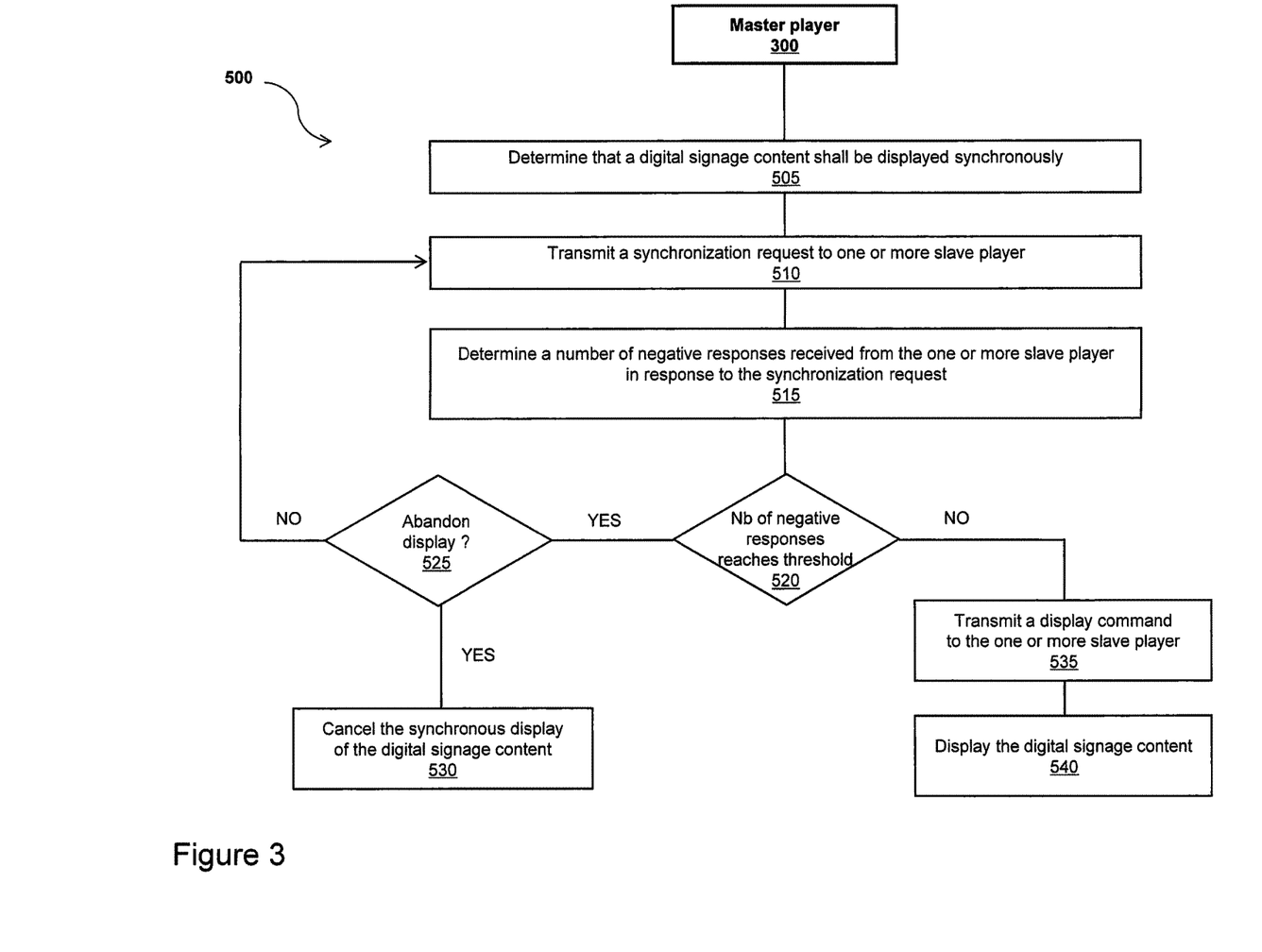
FIG. 3 illustrates a method for synchronizing display of a digital signage content on the master player and on the one or more slave player of FIG. 2.

Referring now concurrently to FIGS. 2 and 3, a method 500 for synchronizing display of the digital signage content 370 on the master player 300 and on one or more slave player 400 is represented in FIG. 3. The method 500 is implemented by the master player 300.

The components (processing unit 310, memory 320, display 360 and communication interface 330) of the master player 300 are identical to the corresponding components (processing unit 210, memory 220, display 260 and communication interface 230) of the player 200 represented in FIG. 1. The components of the slave players 400 are not represented in FIG. 2 for simplification purposes, but are identical to the components of the master player 300. Although two slave players 400 are represented in FIG. 2, the method 500 is applicable to any number of slave player 400 greater or equal to one.

A specific computer program has instructions for implementing the steps of the method 500. The instructions are comprised in a non-transitory computer program product (e.g. the memory 320). The instructions provide for synchronizing display of the digital signage content 370 on the master player 300 and on one or more slave player 400, when executed by the processing unit 310 of the master player 300. The instructions are deliverable via an electronically-readable media, such as a storage media (e.g. a USB key), or via communication links (e.g. a Wi-Fi or cellular network) through the communication interface 330 of the master player 300.

The method 500 comprises the step 505 of determining that the digital signage content 370 shall be displayed synchronously on the display 360 of the master player 300 and on the display of the one or more slave player 400. Step 505 is executed by the processing unit 310 of the master player 300.

A plurality of digital signage content identifiers is stored in the memory 320 of the master player 300. Each digital signage content identifier identifies a corresponding digital signage content. At a given instant, the processing unit 310 determines that the given digital signage content 370 among the plurality of digital signage contents shall be displayed synchronously on the display 360 of the master player 300 and on the display of the one or more slave player 400. The given digital signage content 370 is identified by its identifier. The determination is performed based on one or more criterion. Examples of criteria include a display loop (defining a sequence of digital signage contents to be displayed over time), current audience characteristics of the master player 300 determined statistically and/or in real time, etc.

Before proceeding with step 510 of the method 500, the processing unit 310 checks if the determined digital signage content 370 is present in the memory 320. If it is not present, the processing unit 310 performs the download of the determined digital signage content 370 for storage in the memory 320.

The method 500 comprises the step 510 of transmitting a synchronization request to the one or more slave player 400. Step 510 is executed by the processing unit 310 of the master player 300. The synchronization request is transmitted via the communication interface 330. The synchronization request comprises the digital signage content identifier of the synchronized digital signage content 370 to be displayed. As mentioned previously, the goal of the synchronization request is to determine if the one or more slave player 400 is capable of displaying the digital signage content 370.

The synchronization request is broadcasted. The advantage of broadcasting is that the master player 300 does not need to know how to reach the one or more slave player 400. For instance, if the Internet Protocol (IP) is used, the master player 300 does not need to know the IP address or Domain Name Server (DNS) name of the one or more slave player 400. The broadcast synchronization request is received by all the devices within reach of the broadcast domain. For example, the broadcast synchronization request is transmitted using the User Datagram Protocol (UDP).

As mentioned previously, the master player 300 and the one or more slave player 400 belong to a synchronized group. The synchronized group has a group identifier, to identify the synchronized group and differentiate it from other synchronized groups. The group identifier is stored in the memory 320 of the master player 300 and in the memory of the one or more slave player 400.

The group identifier is included (by the processing unit 310) in the synchronization request. Thus, the one or more slave player 400 receives the synchronization request, and determines that it should process the synchronization request because of the presence of the group identifier in the synchronization request (which matches the group identifier stored in its memory). Similarly, another slave player (not represented in FIG. 2) not belonging to the synchronized group determines that it should not process the synchronization request because of the presence of the group identifier in the synchronization request (which does not match the group identifier stored in its memory).

Alternatively, the multicast technology is used Instead of the broadcast technology. For example, each synchronized group is associated to a corresponding multicast group. The synchronization request is transmitted to the multicast group corresponding to the synchronized group by the master player 300. The one or more slave player 400 joins the multicast group, to receive the multicast synchronization request. For example, the multicast synchronization request is transmitted using the UDP protocol.

Alternatively, the master player 300 stores in the memory 320 a communication identifier (e.g. IP address or DNS name) of the one or more slave player 400. The master player 300 transmits a unicast synchronization request to each one of the slave player 400, using the respective communication identifier(s). For example, the unicast synchronization request is transmitted using the Transmission Control Protocol (TCP).

Other alternatives include a time-based synchronization, where the slave players 400 need to know the IP address of the master player 300; a cloud-based synchronization where the coordination between the master and slaves is based on a cloud service; etc.

The processing of the synchronization request by the one or more slave player 400 will be detailed later in the description.

The method 500 comprises the step 515 of determining a number of negative responses received from the one or more slave player 400 in response to the synchronization request sent at step 510. Each negative response is indicative of one among the one or more slave player 400 not being capable of displaying the digital signage content 370. Step 515 is executed by the processing unit 310 of the master player 300.

The negative response may include the digital signage content identifier of the digital signage content 370. This allows the master player 300 to distinguish between concurrently received negative responses corresponding to different synchronized digital signage contents 370 to be displayed on the master player 300 and the one or more slave player 400.

A slave player 400 sends a negative response if it is not capable of displaying the digital signage content 370, and does not send any response if it is capable of displaying it. For example, if the number of slave players 400 is N, 0 to N negative responses may be received by the master player 300. The master player 300 waits for a given amount of time after sending the synchronization request at step 510, to leave enough time to the one or more slave player 400 to process the synchronization request and send the negative response if applicable. At the end of the given amount of time, the total number of negative responses received by the master player 300 is determined. The given amount of time is stored in the memory 320 and can be configured.

Alternatively, a slave player 400 sends a negative response if it is not capable of displaying the digital signage content 370, and sends a positive response if it is capable of displaying it. For example, the response comprises a flag indicating the capability or incapability of displaying the digital signage content 370. In this case, a response (positive or negative) is expected from each slave player 400. Once the expected response has been received from all the slave players 400, the total number of negative responses received by the master player 300 is determined.

The method 500 comprises the step 520 of determining if the number of negative responses determined at step 515 reaches a threshold. Step 520 is executed by the processing unit 310 of the master player 300. The threshold is stored in the memory 320 and can be reconfigured.

In a first implementation, the threshold evaluated at step 520 is set to one. In this case, if at least one slave player 400 sends a negative response, then the threshold is reached. In another implementation, the threshold evaluated at step 520 is a percentage of the total number of slave players 400 (belonging to the synchronized group). For example, the total number of slave players 400 is 5 and the threshold is set to 25%. In this case, if at least two slave players 400 send a negative response, then the threshold is reached.

If the threshold is reached, then step 525 is executed. Otherwise, step 535 is executed.

The method 500 comprises the step 525 of determining if the display of the digital signage content 370 shall be abandoned or not. Step 525 is executed by the processing unit 310 of the master player 300.

In a first implementation, step 525 consists in determining if a maximum number of synchronization requests is reached (maximum number of iterations of step 510). The maximum number of synchronization requests is stored in the memory 320 and can be reconfigured.

Each time step 510 is performed (for a given synchronized digital signage content 370), the number of transmitted synchronization requests is incremented by one. The number of transmitted synchronization requests is initialized at 0 at step 505. The number of transmitted synchronization requests is compared to the maximum number of synchronization requests at step 525.

If the maximum number of synchronization requests is not reached, the method 500 proceeds to step 510, and a new synchronization request is sent to the one or more slave player 400. Thus, if the maximum number of synchronization requests is N, then a maximum of N iterations of steps 510, 515, 520 and 525 is performed before proceeding to step 530.

If the maximum number of synchronization requests is reached, step 530 is executed.

Step 530 of the method 500 consists in cancelling the synchronous display of the digital signage content 370 on the display 360 of the master player 300 and on the display of the one or more slave player 400. Step 530 is executed by the processing unit 310 of the master player 300.

With respect to the master player 300, step 530 simply consists in terminating the execution of the method 500. The master player 300 may further set a timer for trying to display the synchronized digital signage content 370 later (by re-executing the method 500 later). The master player 300 may also select a new synchronized digital signage content 370 according to step 505, and proceed with applying the method 500 to the new synchronized digital signage content 370.

With respect to the one or more slave player 400, step 530 simply consists in not sending a display command which will be described at step 535 of the method 500.

In a simplified implementation of the method 500, the maximum number of synchronization requests (the maximum number of iterations of step 510) is set to one, and step 525 is omitted. Thus, If the threshold is reached at step 520, step 530 is executed directly.

In another implementation of step 525 of the method 500, the maximum number of synchronization requests (the maximum number of iterations of step 510) is not determined by a pre-defined maximum count, but by a maximum duration. Thus, at step 525, if the maximum duration is not reached, the master player 300 proceeds with a new iteration of step 510. However, if the maximum duration is reached, the master player 300 proceeds with the execution of step 530. The duration is initialized at step 505. In still another implementation of step 525 of the method 500, if the maximum duration is reached, the master player 300 proceeds with the execution of step 535 even if one or more slave player 400 is not capable of displaying the digital signage content 370.

Optionally, before sending the new synchronization request (repeating step 510 with a new request), the master player 300 waits for a pre-defined amount of time after the determination at step 525 has been performed. This pre-defined amount of time allows a slave player(s) 400 which was not capable of displaying the digital signage content 370, to correct the situation and become capable of displaying the digital signage content 370. The pre-defined amount of time is stored in the memory 320 and can be reconfigured.

The pre-defined amount of time may be increased at each iteration. For instance, the pre-defined amount of time is set to 10 seconds for the first new synchronization request sent (second iteration of step 510), the pre-defined amount of time is set to 30 seconds for the second new synchronization request sent (third iteration of step 510), etc.

The method 500 comprises the step 535 of transmitting a display command to the one or more slave player 400, for displaying the digital signage content 370 on the display of the one or more slave player 400. Step 535 is executed by the processing unit 310 of the master player 300. The display command is transmitted via the communication interface 330. The display command comprises the digital signage content identifier of the synchronized digital signage content 370 to be displayed.

As mentioned previously, the display command may be broadcasted, multicasted or unicasted.

The processing of the display command by the one or more slave player 400 will be detailed later in the description.

The method 500 comprises the step 540 of displaying the digital signage content 370 on the display 360 of the master player 300. Step 540 is executed by the processing unit 310 of the master player 300. Substantially at the same time, the digital signage content 370 is displayed on the display of the one or more slave player 400, to provide the synchronous display functionality supported by the method 500.

In order to ensure the synchronous display, the display command may include a time reference for displaying the digital signage content 370. For example, an absolute time reference is used. The digital signage content 370 is displayed on the master player 300 and on the slave player(s) 400 when the absolute time reference is reached. In another example, a relative time reference is used. The digital signage content 370 is displayed on the master player 300 after the relative time reference is elapsed following the sending of the display command. The digital signage content 370 is displayed on the slave player(s) 400 after the relative time reference is elapsed following the reception of the display command.

Alternatively, the digital signage content 370 is displayed on the master player 300 directly after sending of the display command. The digital signage content 370 is displayed on the slave player(s) 400 directly after receiving the display command. The delay for transmitting the display command (over a communication network) is considered negligible and the simultaneous display on the master (300) and slave (400) players is considered substantially synchronous.

Figure 4:
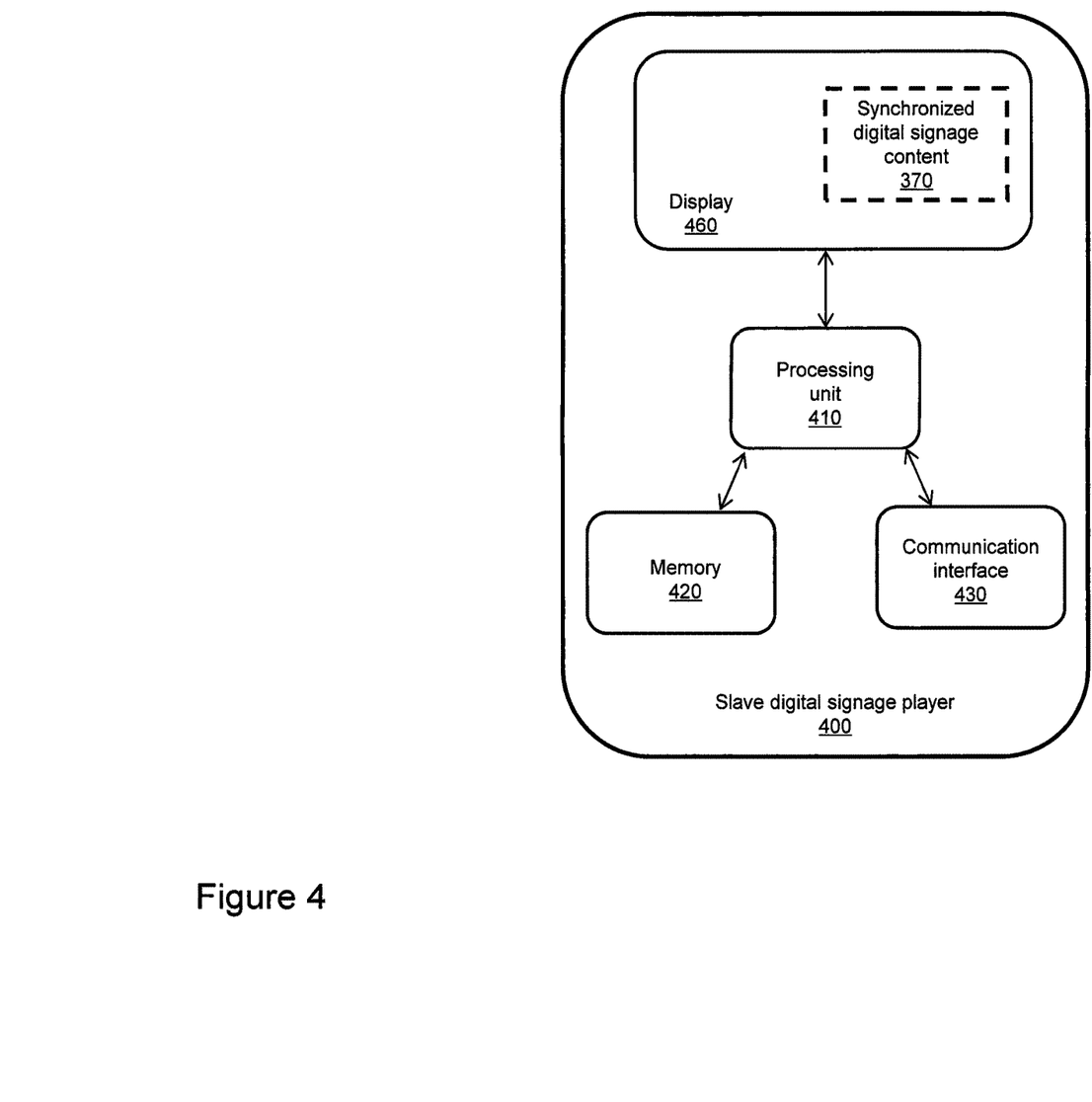
FIG. 4 represents components of the slave player of FIG. 2.
Figure 5:
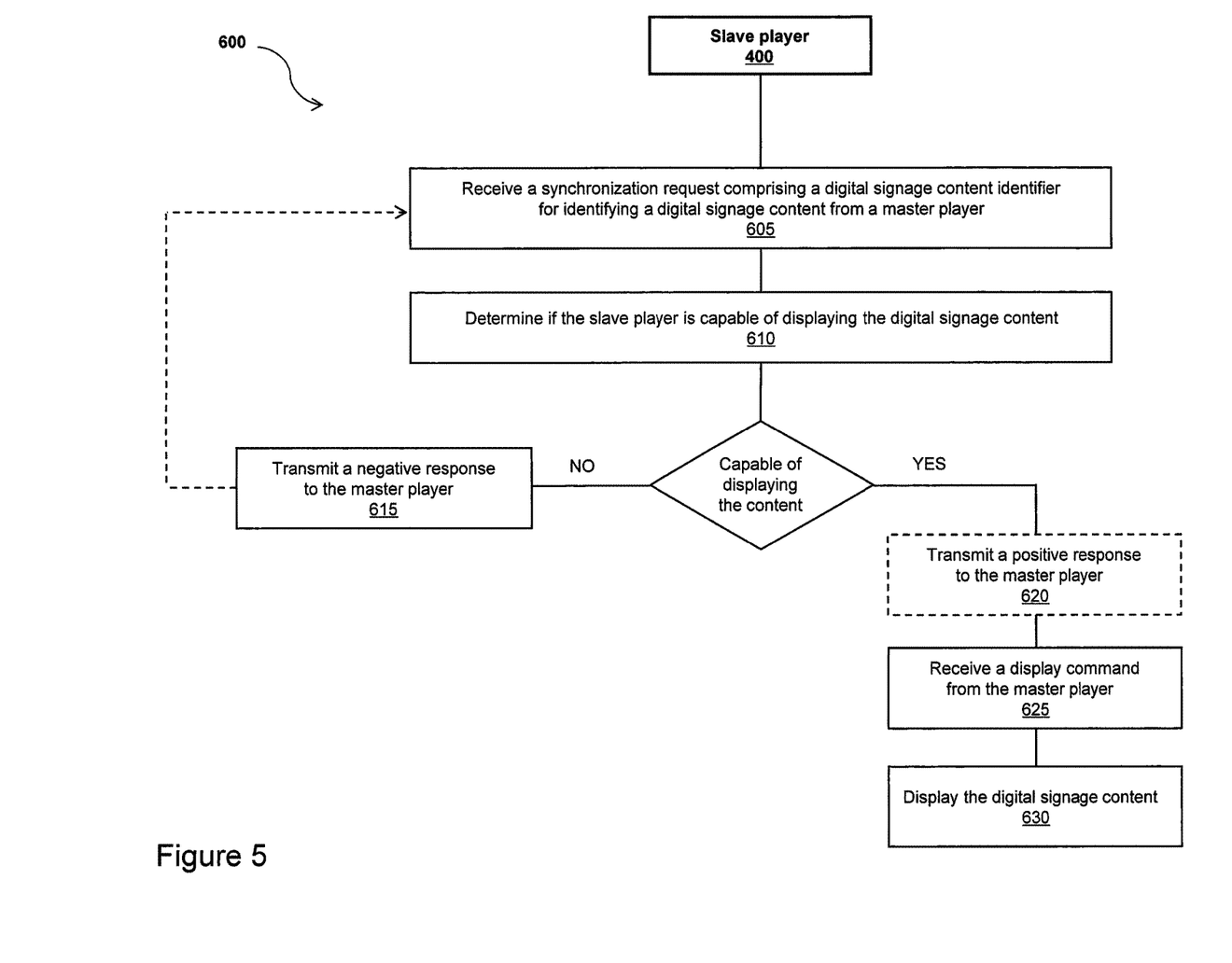
FIG. 5 illustrates a complementary method for synchronizing display of the digital signage content on the master player and on the one of the slave players of FIG. 2.

Referring now concurrently to FIGS. 2, 4 and 5, a method 600 for synchronizing display of the digital signage content 370 on the master player 300 and on one of the slave players 400 is represented in FIG. 5. The method 600 is implemented by each slave player 400 represented in FIG. 2.

FIG. 4 details the components of the slave player 400. The components (processing unit 410, memory 420, display 460 and communication interface 430) of the slave player 400 are identical to the corresponding components (processing unit 210, memory 220, display 260 and communication interface 230) of the player 200 represented in FIG. 1.

A specific computer program has instructions for implementing the steps of the method 600. The instructions are comprised in a non-transitory computer program product (e.g. the memory 420). The instructions provide for synchronizing display of the digital signage content 370 on the master player 300 and the slave player 400, when executed by the processing unit 410 of the slave player 400. The instructions are deliverable via an electronically-readable media, such as a storage media (e.g. a USB key), or via communication links (e.g. a Wi-Fi or cellular network) through the communication interface 430 of the slave player 400.

The method 600 comprises the step 605 of receiving a synchronization request from the master player 300. Step 605 is executed by the processing unit 410 of the slave player 400. The synchronization request is received via the communication interface 430. The synchronization request comprises the digital signage content identifier of the synchronized digital signage content 370 to be displayed. Step 605 corresponds to step 510 of the method 500 represented in FIG. 3.

As mentioned previously, the synchronization request may be broadcasted, multicasted or unicasted.

If the synchronization request is broadcasted, the aforementioned group identifier is included (by the master player 300) in the synchronization request. As mentioned previously, the master player 300 and the slave player 400 belong to a synchronized group identified by the group identifier.

The group identifier is stored in the memory 420 of the slave player 400. Upon reception of the synchronization request at step 605, the processing unit 410 of the slave player 400 determines that it should process the synchronization request because of the presence of the group identifier (which matches the group identifier stored in its memory 420). However, upon reception of another synchronization request at step 605, the processing unit 410 of the slave player 400 determines that it should not process the other synchronization request because of the presence of another group identifier (which does not match the group identifier stored in its memory 420).

If the synchronization request is multicasted, the synchronization request is transmitted to a multicast group corresponding to the synchronized group by the master player 300. The slave player 400 joins the multicast group before executing step 605, to be able to receive the multicast synchronization request at step 605.

The method 600 comprises the step 610 of determining if the slave player 400 is capable of displaying the digital signage content 370 (corresponding to the digital signage content identifier included in the synchronization request) on the display 460 of the slave player 400. Step 610 is executed by the processing unit 410 of the slave player 400.

Various circumstances may lead to the determination that the slave player 400 is not capable of displaying the digital signage content 370. Following are a few examples, which are not intended to be limitative.

In a first example, the digital signage content 370 is not stored in the memory 420 of the slave player 400. As mentioned previously, in the context of digital signage, displaying digital signage content stored in the memory 420 is preferred to streaming the digital signage content from a remote server without storage in the memory 420. The digital signage content 370 is not stored in the memory 420 because the digital signage content 370 has not been downloaded yet from a remote server. Alternatively, the digital signage content 370 was previously downloaded from a remote server and stored in the memory 420. However, the digital signage content 370 has been erased from the memory 420, has been corrupted, etc. In any of these cases, the processing unit 410 of the slave player 400 initiates a download of the digital signage content 370 following step 615 and stores the downloaded digital signage content 370 in the memory 420.

In a second example, the display 460 of the slave player 400 is not operational and does not allow display of the digital signage content 370. In this case, the processing unit 410 of the slave player 400 initiates a procedure to reset the display 460 to an operational state.

In a third example, the slave player 400 already has scheduled digital signage content to display on the display 460 and cannot cancel/interrupt the display of the scheduled digital signage content for displaying the digital signage content 370.

The method 600 comprises the step 615 of transmitting a negative response (indicative of the slave player 400 not being capable of displaying the digital signage content 370) to the master player 300. Step 615 is executed by the processing unit 410 of the slave player 400. The negative response is transmitted via the communication interface 430. Step 615 corresponds to step 515 of the method 500 represented in FIG. 3.

As mentioned previously, the negative response may include the digital signage content identifier of the digital signage content 370. This allows the master player 300 to distinguish between concurrently received negative responses corresponding to different synchronized digital signage contents 370 to be displayed on the master player 300 and the one or more slave player 400.

As mentioned previously, the slave player 400 sends a negative response (step 615) if it is not capable of displaying the digital signage content 370, and does not send any response if it is capable of displaying it. Alternatively, the slave player 400 sends a negative response (step 615) if it is not capable of displaying the digital signage content 370, and sends a positive response (optional step 620) if it is capable of displaying it. For example, the response comprises a flag indicating the capability or incapability of displaying the digital signage content 370.

Following step 615, step 605 may be performed again and a new synchronization request is received from the master player 300. As mentioned previously, the master player 300 sends up to a maximum number of consecutive synchronization requests, and consequently the slave player 400 receives up to the maximum number of consecutive synchronization requests. This procedure has been detailed previously when describing the steps (more specifically step 525) of the method 500 illustrated in FIG. 3. Thus, several iterations of steps 605, 610 and 615 may occur. The maximum number of iterations corresponds to the maximum number of consecutive synchronization requests sent by the master player 300.

For example, when a first synchronization request is received at step 605, it is determined at step 610 that the slave player 400 is not capable of displaying the digital signage content 370 and a first negative response is sent at step 615. When a second synchronization request is received at step 605, it is determined at step 610 that the slave player 400 is now capable of displaying the digital signage content 370 and the method 600 proceeds to optional step 625 or to step 630. Alternatively, when the second synchronization request is received at step 605, it is determined at step 610 that the slave player 400 is still not capable of displaying the digital signage content 370 and a second negative response is sent at step 615. This iterative procedure ends either when it is determined at step 610 that the slave player 400 is capable of displaying the digital signage content 370 or when the maximum number of consecutive synchronization requests is reached.

The method 600 comprises the optional step 620 of transmitting the positive response (indicative of the slave player 400 being capable of displaying the digital signage content 370) to the master player 300. Step 620 is executed by the processing unit 410 of the slave player 400. The positive response is transmitted via the communication interface 430. As mentioned previously, step 620 is executed if the determination at step 610 is positive.

The method 600 comprises the step 625 of receiving a display command from the master player 300, for displaying the digital signage content 370 on the display 460 of the slave player 400. Step 625 is executed by the processing unit 410 of the slave player 400. The display command is received via the communication interface 430. The display command comprises the digital signage content identifier of the synchronized digital signage content 370 to be displayed. Step 625 corresponds to step 535 of the method 500 represented in FIG. 3.

As mentioned previously, the display command may be broadcasted, multicasted or unicasted.

The method 600 comprises the step 630 of displaying the digital signage content 370 on the display 460 of the slave player 400. Step 630 is executed by the processing unit 410 of the slave player 400. Substantially at the same time, the digital signage content 370 is displayed on the display 360 of the master player 300, to provide the synchronous display functionality supported by the method 600.

As mentioned previously, in order to ensure the synchronous display on the master (300) and slave (400) players, the display command may include a time reference (an absolute or a relative time reference). In this case, the display of the digital signage content 370 on the display 460 at step 630 is performed after the execution of step 625 with a timing in accordance with the time reference.

Alternatively, the digital signage content 370 is displayed on the display 460 (step 630) directly after receiving the display command at step 625.

The method 500 illustrated in FIG. 3 and the method 600 illustrated in FIG. 5 are not limited to the field of digital signage. These methods apply more generally to the synchronized display of a digital content (e.g. a video, a still image, etc.) on a master computing device (corresponding to the aforementioned master player 300) and on one or more slave computing device (corresponding to the aforementioned slave player 400).

Figure 6:
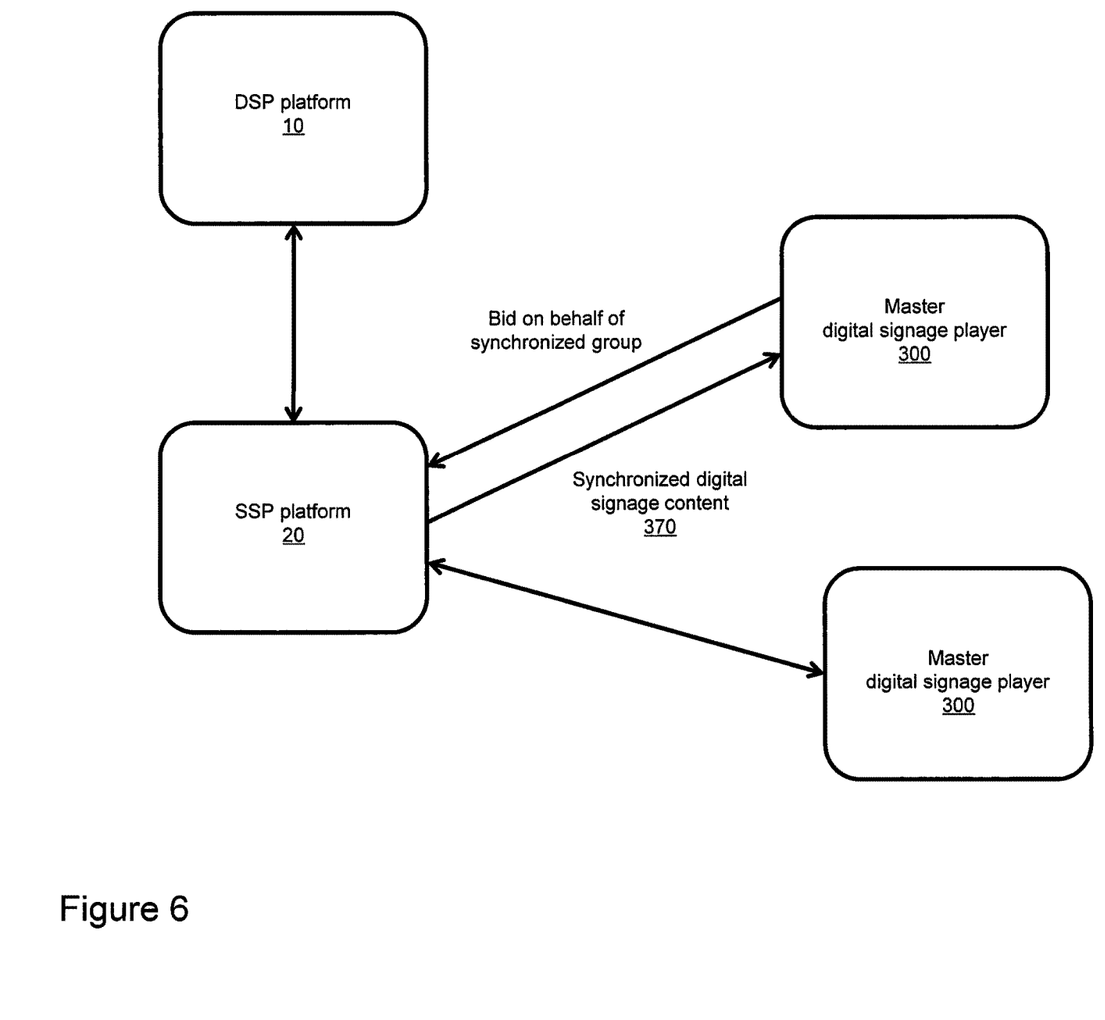
FIG. 6 illustrates an architecture allowing the master player of FIG. 2 to bid for digital signage content.

Referring now concurrently to FIGS. 2 and 6, an architecture allowing master players 300 to bid for synchronized digital signage content 370 is illustrated. Two master players 300 are represented in FIG. 6, but any number of master players 300 may be interacting with a supply-side platform (SSP) 20.

The SSP 20 is well known in the art of advertising. It allows publishers to automate the selling of their advertising space or inventory. The SSP 20 is designed to allow the publishers to maximize the price at which they sell their advertising space or inventory. Each master player 300 can be considered as an independent publisher selling advertising space via the SSP 20.

As mentioned previously, each master player 300 controls a synchronized group comprising the master player 300 and one or more slave player 400 (not represented in FIG. 6 for simplification purposes). The grouping is based on a predicted common audience of the master player 300 and the one or more slave player 400. The predicted audience is determined based on static audience characteristics of the players (e.g. location of the players, proximity of the players with respect to one another, expected profile of the viewers, etc.). A group is constituted of players having common audience characteristics. An election process is used for determining a master player among the group of players, the rest of the players being the slave player(s). The audience characteristics of the players can also be determined at least partially dynamically, using one or more sensors on the players (e.g. cameras for determining persons coming closer to/moving away from a player, etc.). The grouping is dynamic and can evolve over time, following a corresponding evolution of the audience characteristics of the players. Furthermore, a mechanism is implemented for allowing one of the slave players 400 to take over the role of master player for the group, should the elected master player 300 becoming unavailable. For example, a backup master player is selected in advance among the slave players 400 for taking over if required. Alternatively, the selection of a new master player is performed only upon effective failure of the master player 400. A heartbeat protocol can be used for regularly checking that the master player 400 is up and running.

Each synchronized group is characterized by parameters which are common to the master player 300 and the one or more slave player 400. Examples of parameters include the predicted audience of the synchronized group (for example a number of persons in front of the displays of the players), a geometry of the displays of the players, a latitude and longitude of the players, etc. The parameters of the synchronized group are transmitted by the master player 300 to the SSP 20 process, to perform a bidding process for the advertising space available for the synchronized group. During the bidding process, the SSP 20 determines (based on the transmitted parameters) the synchronized digital signage content(s) 370 to be displayed simultaneously on the master player 300 and the one or more slave player 400 of the synchronized group. The determined synchronized digital signage content(s) 370 is downloaded by the master player 300 and the one or more slave player 400 before the synchronous display effectively takes place. The master player 400 is in charge of coordinating the digital signage content(s) 370 delivery to the slave players 400.

The demand-side platform (DSP) 10 represented in FIG. 6 is a counterpart of the SSP 20. It allows advertisers to buy impressions from a plurality of publishers. In FIG. 6, the SSP 20 is the intermediation platform between advertisers represented by the DSP 10 and the master players 300. The DSP 10 has a plurality of digital signage contents to play and the master players 300 have advertising space available for playing the digital signage contents. The SSP 20 selects which digital signage content 370 is adapted to a given master player 300, based on the parameters of the synchronized group represented by the given master player 300.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for synchronizing display of a digital content on a master computing device and on one or more slave computing device, the method comprising:
   storing by a processing unit of the master computing device in a memory of the master computing device a plurality of digital content identifiers identifying a corresponding plurality of digital contents;
   determining by the processing unit of the master computing device based on one or more criterion a given digital content among the plurality of digital contents to be displayed synchronously on a display of the master computing device and on a display of the one or more slave computing device, the given digital content being identified by a corresponding given digital content identifier among the plurality of digital content identifiers;
   (a) transmitting by the processing unit of the master computing device a synchronization request to the one or more slave computing device, the synchronization request comprising the given digital content identifier;
   (b) determining by the processing unit of the master computing device a number of negative responses received from the one or more slave computing device in response to the synchronization request, each negative response being indicative of one among the one or more slave computing device not being capable of displaying the given digital content, the number of negative responses received being an integer comprised between 0 and N where N is the number of slave computing devices;
   (c) if the number of negative responses received does not reach a threshold, transmitting by the processing unit of the master computing device a display command to the one or more slave computing device for displaying the given digital content on the display of the one or more slave computing device, the display command comprising the given digital content identifier;

(d) if the number of negative responses received reaches the threshold and a condition for abandoning the synchronous display of the given digital content is met, cancelling by the processing unit of the master computing device the synchronous display of the given digital content on the display of the master computing device and on the display of the one or more slave computing device; and (e) if the number of negative responses received reaches the threshold and the condition for abandoning the synchronous display of the given digital content is not met, repeating steps (a), (b), (c), (d) and (e).

2. The method of claim 1, wherein the condition for abandoning the synchronous display of the given digital content consists of the number of iterations of step (a) reaching a maximum value.

3. The method of claim 1, wherein the condition for abandoning the synchronous display of the given digital content consists of a maximum value of a duration being reached.

4. The method of claim 3, wherein the duration is the time elapsed since the determination of the given digital content among the plurality of digital contents to be displayed synchronously.

5. The method of claim 1, wherein if the number of negative responses received does not reach the threshold, the processing unit of the master computing device further displays the given digital content on the display of the master computing device after transmitting the display command.

6. The method of claim 1, wherein the processing unit of the master computing device waits for a pre-defined amount of time before transmitting the synchronization request when performing an iteration of step (a) greater or equal than 2.

7. The method of claim 1, wherein the master computing device consists of a master digital signage player, the one or more slave computing device consists of one or more slave digital signage player, and the plurality of digital contents consists of a plurality of digital signage contents.

8. The method of claim 1, wherein the synchronization request is broadcasted.

9. The method of claim 1, wherein the one or more criterion comprises a display loop defining a sequence of digital contents to be displayed over time, and current audience characteristics of the master computing device.

10. A non-transitory computer program product comprising instructions executable by a processing unit of a master computing device, the execution of the instructions by the processing unit of the master computing device providing for synchronizing display of a digital content on the master computing device and on one or more slave computing device by:

storing by the processing unit of the master computing device in a memory of the master computing device a plurality of digital content identifiers identifying a corresponding plurality of digital contents;

determining by the processing unit of the master computing device based on one or more criterion a given digital content among the plurality of digital contents to be displayed synchronously on a display of the master computing device and on a display of the one or more slave computing device, the given digital content being identified by a corresponding given digital content identifier among the plurality of digital content identifiers;

(a) transmitting by the processing unit of the master computing device a synchronization request to the one or more slave computing device, the synchronization request comprising the given digital content identifier;

(b) determining by the processing unit of the master computing device a number of negative responses received from the one or more slave computing device in response to the synchronization request, each negative response being indicative of one among the one or more slave computing device not being capable of displaying the given digital content, the number of negative responses received being an integer comprised between 0 and N where N is the number of slave computing devices;

(c) if the number of negative responses received does not reach a threshold, transmitting by the processing unit of the master computing device a display command to the one or more slave computing device for displaying the given digital content on the display of the one or more slave computing device, the display command comprising the given digital content identifier;

(d) if the number of negative responses received reaches a threshold and a condition for abandoning the synchronous display of the given digital content is met, cancelling by the processing unit of the master computing device the synchronous display of the given digital content on the display of the master computing device and on the display of the one or more slave computing device; and (e) if the number of negative responses received reaches the threshold and the condition for abandoning the synchronous display of the given digital content is not met, repeating steps (a), (b), (c), (d) and (e).

11. The computer program product of claim 10, wherein the condition for abandoning the synchronous display of the given digital content consists of the number of iterations of step (a) reaching a maximum value.

12. The computer program product of claim 10, wherein the condition for abandoning the synchronous display of the given digital content consists of a maximum value of a duration being reached.

13. The computer program product of claim 12, wherein the duration is the time elapsed since the determination of the given digital content among the plurality of digital contents to be displayed synchronously.

14. The computer program product of claim 10, wherein if the number of negative responses received does not reach the threshold, the processing unit of the master computing device further displays the given digital content on the display of the master computing device after transmitting the display command.

15. The computer program product of claim 10, wherein the processing unit of the master computing device waits for a pre-defined amount of time before transmitting the synchronization request when performing an iteration of step (a) greater or equal than 2.

16. The computer program product of claim 10, wherein the master computing device consists of a master digital signage player, the one or more slave computing device consists of one or more slave digital signage player, and the plurality of digital contents consists of a plurality of digital signage contents.

17. The computer program product of claim 10, wherein the synchronization request is broadcasted.

18. The computer program product of claim 10, wherein the one or more criterion comprises a display loop defining a sequence of digital contents to be displayed over time, and current audience characteristics of the master computing device.

19. A master computing device adapted for synchronizing display of a digital content on the master computer device and on one or more slave computing device, the master computing device comprising:
- memory for storing a plurality of digital content identifiers identifying a corresponding plurality of digital contents;
- a communication interface for exchanging data with the one or more slave computing device;
- a display; and
- a processing unit for:
  - determining based on one or more criterion a given digital content among the plurality of digital contents to be displayed synchronously on the display of the master computing device and on a display of the one or more slave computing device, the given digital content being identified by a corresponding given digital content identifier among the plurality of digital content identifiers;
  - (a) transmitting a synchronization request to the one or more slave computing device via the communication interface, the synchronization request comprising the given digital content identifier;
  - (b) determining a number of negative responses received from the one or more slave computing device in response to the synchronization request via the communication interface, each negative response being indicative of one among the one or more slave computing device not being capable of displaying the given digital content, the number of negative responses received being an integer comprised between 0 and N where N is the number of slave computing devices;
  - (c) if the number of negative responses received does not reach a threshold, transmitting a display command to the one or more slave computing device for displaying the given digital content on the display of the one or more slave computing device, the display command comprising the given digital content identifier;
  - (d) if the number of negative responses received reaches the threshold and a condition for abandoning the synchronous display of the given digital content is met, cancelling the synchronous display of the given digital content on the display of the master computing device and on the display of the one or more slave computing device; and
  - (e) if the number of negative responses received reaches the threshold and the condition for abandoning the synchronous display of the given digital content is not met, repeating steps (a), (b), (c), (d) and (e).

20. The master computing device of claim 19, wherein the condition for abandoning the synchronous display of the given digital content consists of the number of iterations of step (a) reaching a maximum value.

21. The master computing device of claim 19, wherein the condition for abandoning the synchronous display of the given digital content consists of a maximum value of a duration being reached.

22. The master computing device of claim 21, wherein the duration is the time elapsed since the determination of the given digital content among the plurality of digital contents to be displayed synchronously.

23. The master computing device of claim 19, wherein if the number of negative responses received does not reach the threshold, the processing unit further displays the given digital content on the display of the master computing device after transmitting the display command.

24. The master computing device of claim 19, wherein the processing unit waits for a pre-defined amount of time before transmitting the synchronization request when performing an iteration of step (a) greater or equal than 2.

25. The master computing device of claim 19, wherein the master computing device consists of a master digital signage player, the one or more slave computing device consists of one or more slave digital signage player, and the plurality of digital contents consists of a plurality of digital signage contents.

26. The master computing device of claim 19, wherein the synchronization request is broadcasted.

27. The master computing device of claim 19, wherein the one or more criterion comprises a display loop defining a sequence of digital contents to be displayed over time, and current audience characteristics of the master computing device.

* * * * *